(12) United States Patent
Matsuoka et al.

(10) Patent No.: US 11,625,497 B2
(45) Date of Patent: Apr. 11, 2023

(54) FILE MANAGEMENT SYSTEM AND NON-TRANSITORY COMPUTER READABLE MEDIUM

(71) Applicant: FUJIFILM BUSINESS INNOVATION CORP., Tokyo (JP)

(72) Inventors: Daiki Matsuoka, Kanagawa (JP); Naoto Kashiwagi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 214 days.

(21) Appl. No.: 17/015,643

(22) Filed: Sep. 9, 2020

(65) Prior Publication Data
US 2021/0248255 A1 Aug. 12, 2021

(30) Foreign Application Priority Data
Feb. 6, 2020 (JP) .............................. JP2020-019072

(51) Int. Cl.
*G06F 16/21* (2019.01)
*G06F 21/62* (2013.01)
*G06F 16/11* (2019.01)
*G06F 16/13* (2019.01)

(52) U.S. Cl.
CPC .......... *G06F 21/6218* (2013.01); *G06F 16/11* (2019.01); *G06F 16/13* (2019.01)

(58) Field of Classification Search
CPC ........ G06F 16/13; G06F 16/16; G06F 16/173; G06F 16/38; G06F 16/24562; G06F 16/535; G06F 16/176; G06F 21/6218; G06F 16/11; G06F 21/6245; G06F 16/172
See application file for complete search history.

(56) References Cited

U.S. PATENT DOCUMENTS

2016/0094499 A1* 3/2016 Uraizee ................... H04L 51/08
 715/752
2020/0374683 A1* 11/2020 Cholas .................... H04W 8/06

FOREIGN PATENT DOCUMENTS

| JP | H09-330312 A | 12/1997 |
| JP | 2005-215745 A | 8/2005 |
| JP | 2010-073012 A | 4/2010 |

* cited by examiner

*Primary Examiner* — Cindy Nguyen
(74) *Attorney, Agent, or Firm* — Oliff PLC

(57) ABSTRACT

A file management system includes at least one processor. The at least one processor is configured to obtain information about a target file, a storage location of a related file relating to the target file, and a viewer, and, when the viewer is allowed to access the storage location of the related file, provide, to the viewer, storage-location information indicating the storage location of the related file, and, when the viewer is not allowed to access the storage location of the related file, provide the related file to the viewer.

4 Claims, 9 Drawing Sheets

FILE MANAGEMENT SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-019072 filed Feb. 6, 2020.

BACKGROUND

(i) Technical Field

The present disclosure relates to a file management system and a non-transitory computer readable medium.

(ii) Related Art

Japanese Unexamined Patent Application Publication No. 2005-215745 discloses a file management program for causing a computer to function as a file management apparatus. The computer serves as a file management unit which handles copied files. In addition to real-file storage location information which specifies the actual storage locations of the copied files, original-file storage location information, which specifies the storage locations of the original files of the copied files, is set as attribute information to the copied files.

Japanese Unexamined Patent Application Publication No. 2010-073012 discloses a document management apparatus. The document management apparatus includes a first registration unit, a second registration unit, and a related-document registration unit. When an operation of registering a new document is performed, the first registration unit registers, in a storage apparatus, a unique operation identifier, which is given to the operation of registering the new document, in association with the document. When an operation is performed on a first document corresponding to a first operation identifier registered in the storage apparatus, the second registration unit registers, in the storage apparatus, the derivative relationship indicating that a unique second operation identifier, which is given to the operation on the first document, is derived from the first operation identifier. When a second document different from the first document is created as a result of the operation on the first document, the second registration unit registers, in the storage apparatus, the second operation identifier in association with the second document. When an operation on the first document corresponding to the first operation identifier is an operation of setting a related document to the first document, the related-document registration unit registers, in the storage apparatus, a third operation identifier as a related-document attribute of the second operation identifier given to the setting operation. The third operation identifier is registered in the storage apparatus in association with the related document.

Japanese Unexamined Patent Application Publication No. 09-330312 discloses a document management system in which related documents are associated with each other automatically. The document management system includes a reference stack (1-4) and a document management area (1-5). The reference stack (1-4) temporarily stores a home document (1-1) which is a first-opened document, reference documents (1-2) and (1-3) which are opened in association with the home document, and their relationship. The document management area (1-5) is used to store the final reference relationship as related-document attribute information (1-6) of the home document. When the home document (1-1) is opened, the documents (1-2) and (1-3), which are opened in association with the home document (1-1), are stored in the reference stack (1-4) automatically. When the home document (1-1) is closed, a user is asked whether the reference stack (1-4) information is to be stored in the document management area (1-5) or is to be edited. Thus, only the document (1-2) which is necessary is stored. When the document is opened next time and every time thereafter, the related document (1-2) which is necessary is retrieved on the basis of the related-document attribute information (1-6) stored in the document management area (1-5).

There is a known technique in which related documents, which relate to a target document, are stored in association with the target document in accordance with the operation history of the target document. In the technique, when the target document is displayed for editing or the like, the related documents are also displayed with the target document. Assume the case in which the target document is shared with a different user, and in which the related documents relating to the target document are to be displayed. In this case, some of the storage locations of the related documents may not be shared by the different user depending on the storage locations of the related documents, and the different user may fail to access such related documents. In contrast, there is a technique of attaching related documents to a target document. However, as the number of attached related documents increases, the file size increases, resulting in troublesome handling of the target document.

SUMMARY

Aspects of non-limiting embodiments of the present disclosure relate to provide a file management system and a non-transitory computer readable medium which, when a related file is associated with a target file such as a document, allows access to the related file regardless of the storage location of the related file, and which suppresses the data amount of the target file compared with the case in which all of the related files are attached to the target file.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a file management system including at least one processor. The at least one processor is configured to obtain information about a target file, a storage location of a related file relating to the target file, and a viewer, and, when the viewer is allowed to access the storage location of the related file, provide, to the viewer, storage-location information indicating the storage location of the related file, and, when the viewer is not allowed to access the storage location of the related file, provide the related file to the viewer.

BRIEF DESCRIPTION OF THE DRAWINGS

Exemplary embodiment of the present disclosure will be described in detail based on the following figures, wherein.

DETAILED DESCRIPTION

Figure 1:
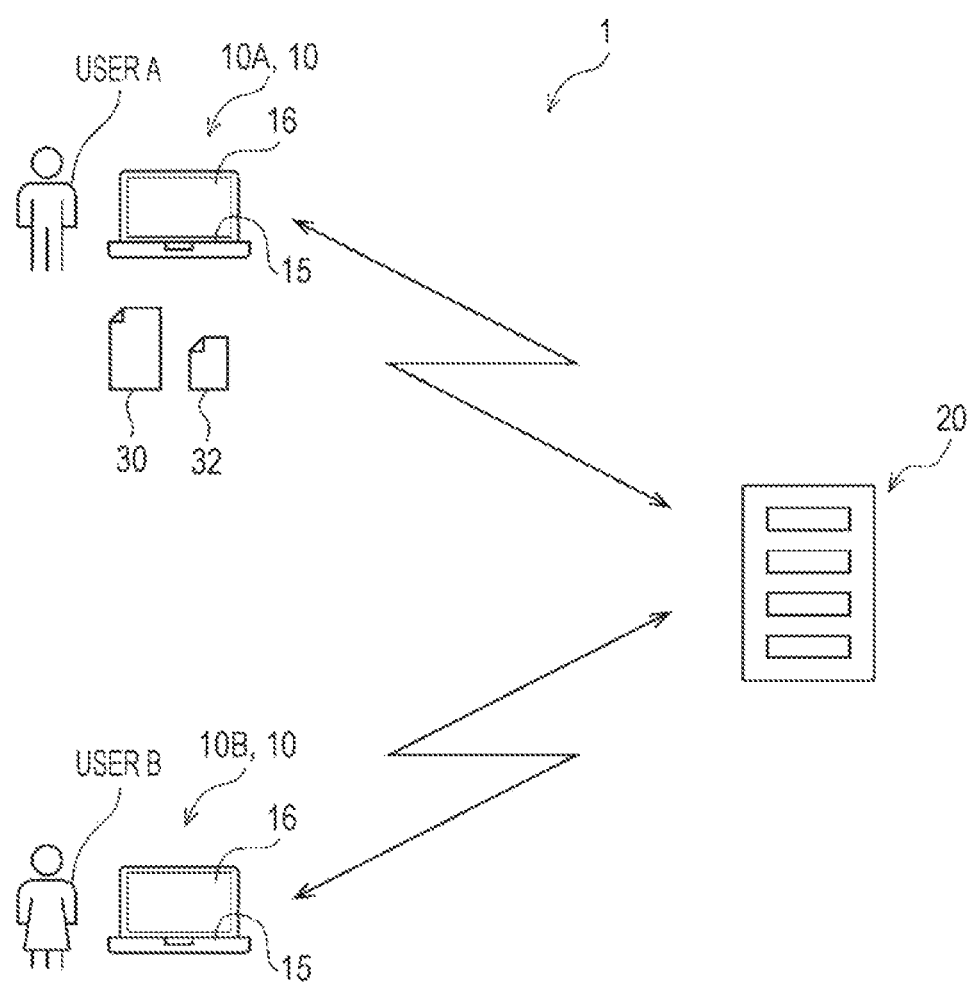
FIG. 1 is a diagram illustrating the schematic configuration of a file management system according to an exemplary embodiment.

An exemplary embodiment of the technique in the present disclosure will be described by referring to the drawings. In the drawings, identical or equivalent components and parts are designated with identical reference characters. The ratio of dimensions in the drawings is exaggerated for the sake of description, and may be different from the actual ratio.

FIG. 1 is a diagram illustrating the schematic configuration of a file management system according to an exemplary embodiment.

As illustrated in FIG. 1, a file management system 1 includes multiple user terminals 10 used by corresponding users, and a server 20. For example, the user terminals 10 include a first user terminal 10A used by one user, user A, and a second user terminal 10B used by a different user, user B. The number of user terminals 10 is not particularly limiting.

For example, the file management system 1 is a system in which the user terminals 10 and the server 20 are connected to each other over the Internet or a wired or wireless network. For example, FIG. 1 illustrates the file management system 1 as a system in which connections are established over a wireless network. The file management system 1 manages files, folders, shortcuts, and the like by using the server 20. In FIG. 1, the first user terminal 10A and the second user terminal 10B have the respective reference characters. When it is not necessary to differentiate the first user terminal 10A from the second user terminal 10B, the first user terminal 10A and the second user terminal 10B are described as "user terminals 10".

Each of the user terminals 10 is formed of a computer, such as a desktop computer, a notebook computer, or a tablet computer. The user terminal 10 is an apparatus which, for example, generates, edits, and stores files. The files include a document file, an image file, and a file which is a combination of documents and images. For example, the user terminal 10 displays files transmitted from other users.

The user terminal 10 includes an input unit 15 and a display unit 16. For example, the user terminal 10 generates, edits, and stores files by using the input unit 15, and the display unit 16 displays the files.

For example, the first user terminal 10A used by user A stores, in association with a file 30 which is any file, related files 32, which relates to the file 30, in accordance with the operation history of the file 30. Herein, the file 30, which is any file and which is associated with the related files 32, is called the target file 30. Herein, each of the target file 30 and the related files 32 is called a corresponding one of a target file 30 and a related file 32 in accordance with its mutual relationship with other files. Every file may serve as a target file 30 or a related file 32 depending on the relationship with other files. The specific configuration and operations of the user terminal 10 will be described below.

The server 20 is formed of a computer. An in-house shared server, a cloud server, or the like is used as the server 20. The server 20 has a function of sharing and managing files, which are transmitted from users, in a service provided for multiple users. For example, when a target file 30 is transmitted from the first user terminal 10A of user A, the server 20 allows the target file 30 to be shared with a different user, user B. When user B opens the target file 30 on the second user terminal 10B, the server 20 allows user B to access the related files 32 relating to the target file 30. The specific configuration and operations of the server 20 will be described below.

Figure 2:
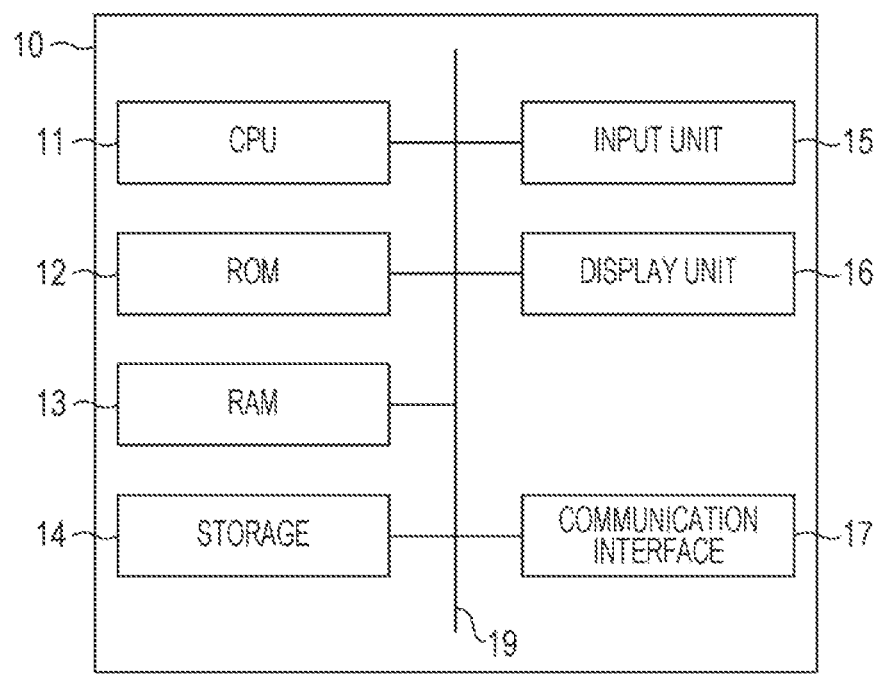
FIG. 2 is a block diagram illustrating the hardware configuration of a user terminal.

FIG. 2 is a block diagram illustrating the hardware configuration of a user terminal 10.

As illustrated in FIG. 2, the user terminal 10 includes a central processing unit (CPU) 11 which is a processor, a read only memory (ROM) 12, a random access memory (RAM) 13, a storage 14, the input unit 15, the display unit 16, and a communication interface 17. The components are communicatively connected to each other through a bus 19.

The CPU 11, which is a central processing unit, executes various programs, and controls the units. That is, the CPU 11 reads programs from the ROM 12 or the storage 14, and executes the programs by using the RAM 13 as a work area. According to the programs recorded in the ROM 12 or the storage 14, the CPU 11 controls the components described above and performs various computing processes. In the exemplary embodiment, the ROM 12 or the storage 14 stores a file management program.

The ROM 12 stores various programs and various types of data. The RAM 13 serves as a work area to store programs and data temporarily. The storage 14, which is formed of a hard disk drive (HDD) or a solid state drive (SSD), stores various programs including an operating system, and various types of data.

The input unit 15, which includes a pointing device such as a mouse and a keyboard, is used to perform various input operations.

The display unit 16, which is, for example, a liquid-crystal display, displays various types of information. The display unit 16 may employ a touch panel system, and may function as the input unit 15.

The communication interface 17, which is an interface for communicating with other apparatuses such as the server 20, uses a standard, such as the Ethernet™, fiber distributed data interface (FDDI), or Wireless Fidelity (Wi-Fi™).

Figure 3:
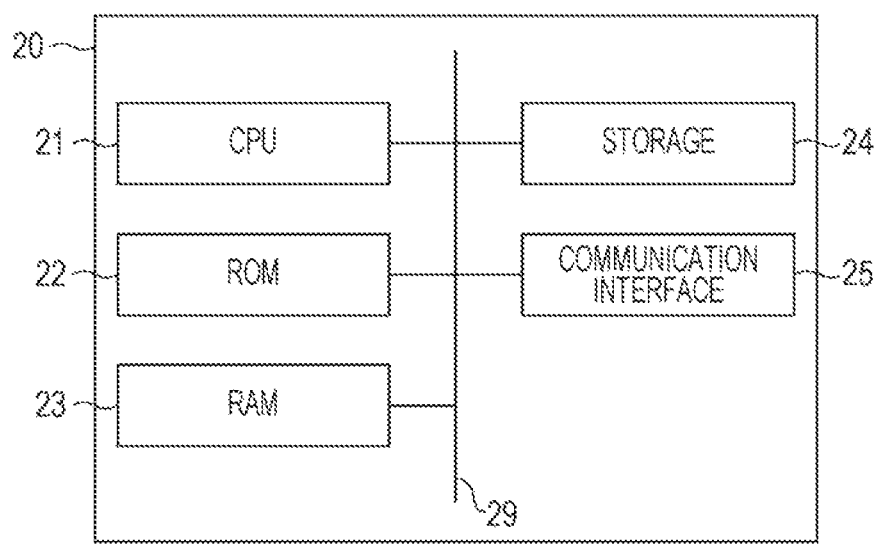
FIG. 3 is a block diagram illustrating the hardware configuration of a server.

FIG. 3 is a block diagram illustrating the hardware configuration of the server 20.

As illustrated in FIG. 3, the server 20 includes a CPU 21, a ROM 22, a RAM 23, a storage 24, and a communication interface 25. The components are communicatively connected to each other through a bus 29.

The CPU 21, which is a central processing unit, executes various programs, and controls the units. That is, the CPU (processor) 21 reads programs from the ROM 22 or the storage 24, and executes programs by using the RAM 23 as a work area. According to the programs recorded in the ROM 22 or the storage 24, the CPU 21 controls the components described above and performs various computing processes. In the exemplary embodiment, the ROM 22 or the storage 24 stores a file management program.

The ROM 22 stores various programs and various types of data. The RAM 23 serves as a work area to store programs or data temporarily. The storage 24, which is formed of an HDD or an SSD, stores various programs including an operating system and various types of data.

The communication interface 25, which is an interface for communicating with other apparatuses such as the user terminals 10, uses a standard, such as the Ethernet™, FDDI, or Wi-Fi™.

The functional configurations of a user terminal 10 and the server 20 will be described below.

Figure 4:
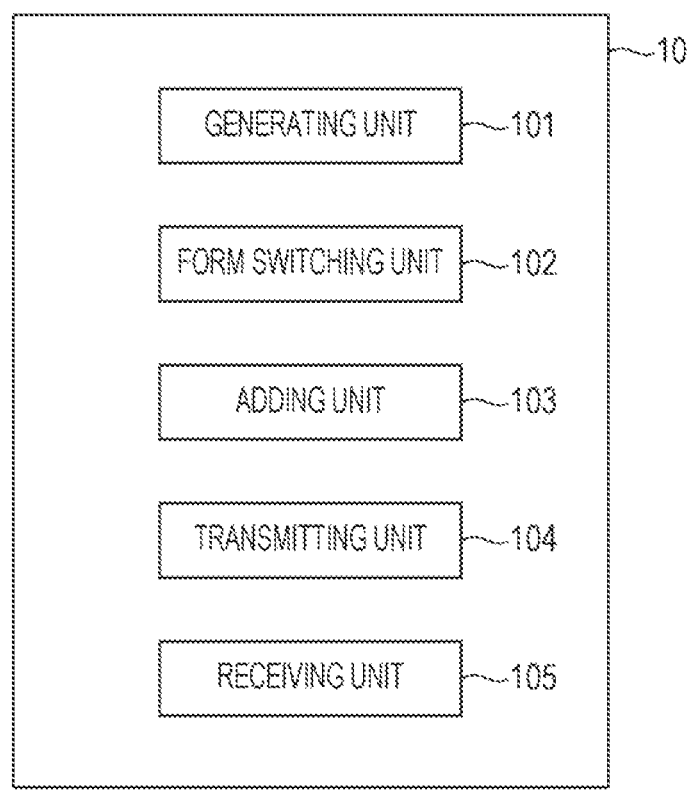
FIG. 4 is a block diagram illustrating an exemplary functional configuration of a user terminal.

FIG. 4 is a block diagram illustrating an exemplary functional configuration of a user terminal 10.

As illustrated in FIG. 4, the user terminal 10 includes, as functional components, a generating unit 101, a form switching unit 102, an adding unit 103, a transmitting unit 104, and a receiving unit 105. The functional components are implemented by the CPU 11 reading the file management program stored in the ROM 12 or the storage 14, and loading the program on the RAM 13 for execution.

The generating unit 101 generates and edits files. For example, a user inputs data by using the input unit 15 of a user terminal 10, and thus generates and edits files. A user may generate and edit files by using data received from other apparatuses through the communication interface 17 of the user terminal 10. For example, when the first user terminal 10A used by user A generates and edits a target file 30 (see FIG. 1), the operation history of the target file 30 is stored in the storage 14 or the like. The user terminal 10 stores information about the related files 32, which relate to the target file 30, in the storage 14 or the like in accordance with the operation history of the target file 30.

The form switching unit 102 switches the form in which a related file 32 is provided to a viewer. For example, in the first user terminal 10A, the form switching unit 102 switches the form, in which a related file 32 is provided to user B who is an exemplary viewer, through selection made by user A. For example, when the form, in which a related file 32 is provided to user B, indicates an object (for example, a related file 32 itself), the form is switched from the related file 32 to information (for example, the link) indicating the storage location of the related file 32, through selection made by user A. For example, when the form, in which a related file 32 is provided to user B, indicates information (for example, the link) indicating the storage location of the related file 32, the form is switched from information indicating the storage location of the related file 32 to the related file 32 (for example, its object), through selection made by user A. The form, in which a related file 32 is provided to user B, may be switched by user A themselves and may be switched in accordance with confirmation of the form which is performed by the server 20.

The adding unit 103 adds a related file 32 relating to a target file 30. The user terminal 10 sets the related files 32 in accordance with the operation history of the target file 30. If a different related file 32 is to be added, the adding unit 103 adds the different related file 32.

The transmitting unit 104 transmits files and the like to the server 20. For example, the first user terminal 10A transmits, to the server 20, a target file 30, information about the forms in which the related files 32 are provided to a different user, information about an additional related file 32, and the like.

The receiving unit 105 receives, from the server 20, files which are transmitted from multiple user terminals 10 to the server 20.

Figure 5:
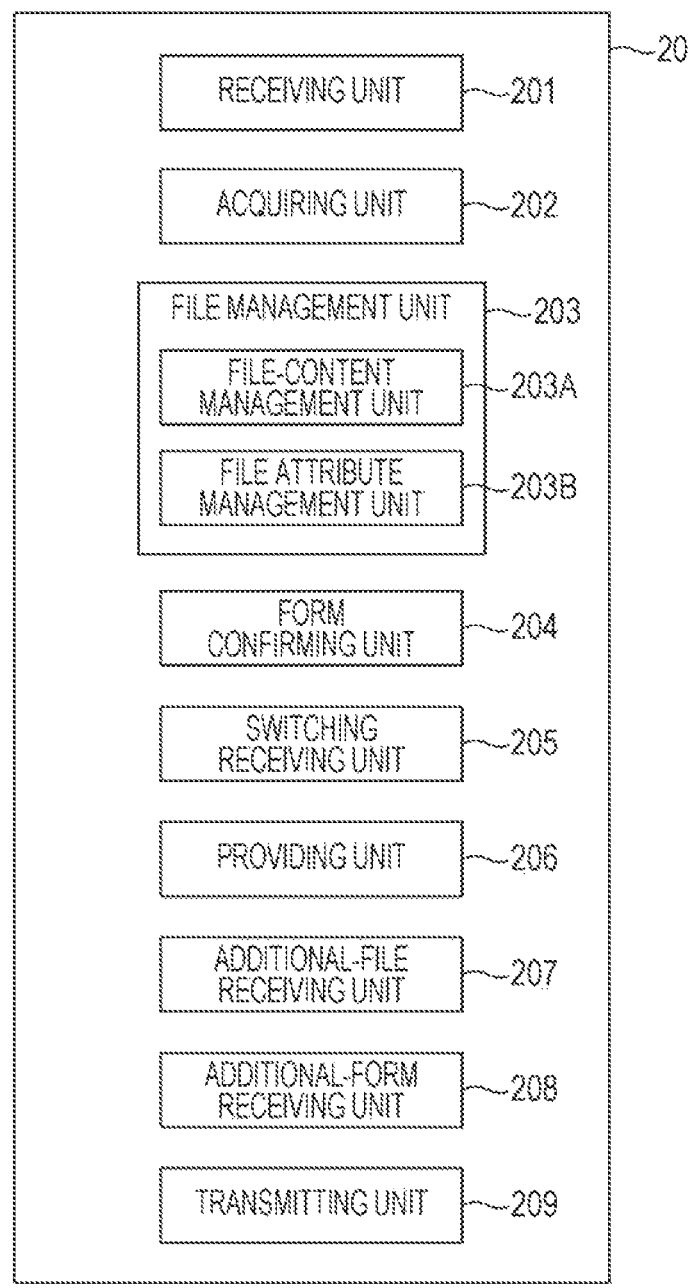
FIG. 5 is a block diagram illustrating an exemplary functional configuration of a server.

FIG. 5 is a block diagram illustrating an exemplary functional configuration of the server 20.

As illustrated in FIG. 5, the server 20 includes, as functional components, a receiving unit 201, an acquiring unit 202, a file management unit 203, a form confirming unit 204, a switching receiving unit 205, a providing unit 206, an additional-file receiving unit 207, an additional-form receiving unit 208, and a transmitting unit 209. The functional components are implemented by the CPU 21 reading the file management program stored in the ROM 22 or the storage 24, and loading the program on the RAM 23 for execution.

The receiving unit 201 receives files and the like transmitted from the user terminals 10. The files include their related information. For example, when a target file 30 is received from the first user terminal 10A, information about related files 32 relating to the target file 30, and the like are included as related information of the target file 30.

The acquiring unit 202 acquires the storage location of a target file 30, the storage locations of the related files 32 relating to the target file 30, and information about user B who is an exemplary viewer.

The file management unit 203 manages the content of files, their attributes, and operations about the files, such as editing. The file management unit 203 includes a file-content management unit 203A and a file attribute management unit 203B, and transmits a request to perform an operation, to the file-content management unit 203A or the file attribute management unit 203B in accordance with the operation request from a user. The file-content management unit 203A manages information about a file itself, such as text information described in the file, information about attached annotations (that is, remarks), and layout information.

The file attribute management unit 203B manages the attributes of a file. Examples of an attribute include a file name, a create date, an update date, an author, an updater, and related-file information. When, for example, an operation of storing a file or editing an attribute by a user triggers a change of an attribute, the file attribute management unit 203B reflects the result in the file attribute. The related-file information includes the forms in which the related files 32 are provided to user B.

The form confirming unit 204 confirms the form, in which a related file 32 is provided to user B, with user A who manages a target file 30. The types of the form, in which a related file 32 is provided to user B, include information (for example, the link) indicating the storage location of the related file 32, and the object (for example, the related file 32 itself). Such an object may be a compressed file obtained by compressing a related file 32. The form confirming unit 204 asks about which form, in which a related file 32 is provided to user B, is to be selected between the information indicating the storage location of the related file 32 and the object. The confirmation result from the form confirming unit 204 is transmitted to the file attribute management unit 203B of the file management unit 203.

The switching receiving unit 205 receives switching of the form in which a related file 32 is provided to user B. For example, the switching receiving unit 205 receives whether the form, in which a related file 32 is provided to user B, is to be switched from the related file 32 to information indicating the storage location of the related file 32 or from the information indicating the storage location of the related file 32 to the related file 32.

The providing unit 206 provides information indicating the storage location of a related file 32 or the related file 32 to user B. For example, when user B is allowed to access the storage location of the related file 32, information indicating the storage location of the related file 32 is provided to user B. When user B is not allowed to access the storage location of the related file 32, the related file 32 is provided to user B.

The additional-file receiving unit 207 receives addition of a related file 32 relating to a target file 30. For example, when the adding unit 103 of a user terminal 10 adds a related file 32, the additional-file receiving unit 207 receives addition of the related file 32.

When the additional-file receiving unit 207 receives addition of a related file 32, the additional-form receiving unit 208 receives the form in which the added related file 32 is provided to user B. The types of the form, in which the added related file 32 is provided to user B, include information (for example, the link) indicating the storage location of the added related file 32, and the added related file 32 (for example, its object).

The transmitting unit 209 transmits files and the like to the user terminals 10. For example, when a target file 30 is received by the receiving unit 201 from the first user terminal 10A, the transmitting unit 209 transmits the target file 30 to the second user terminal 10B.

Operations of the file management system will be described.

Figure 6:
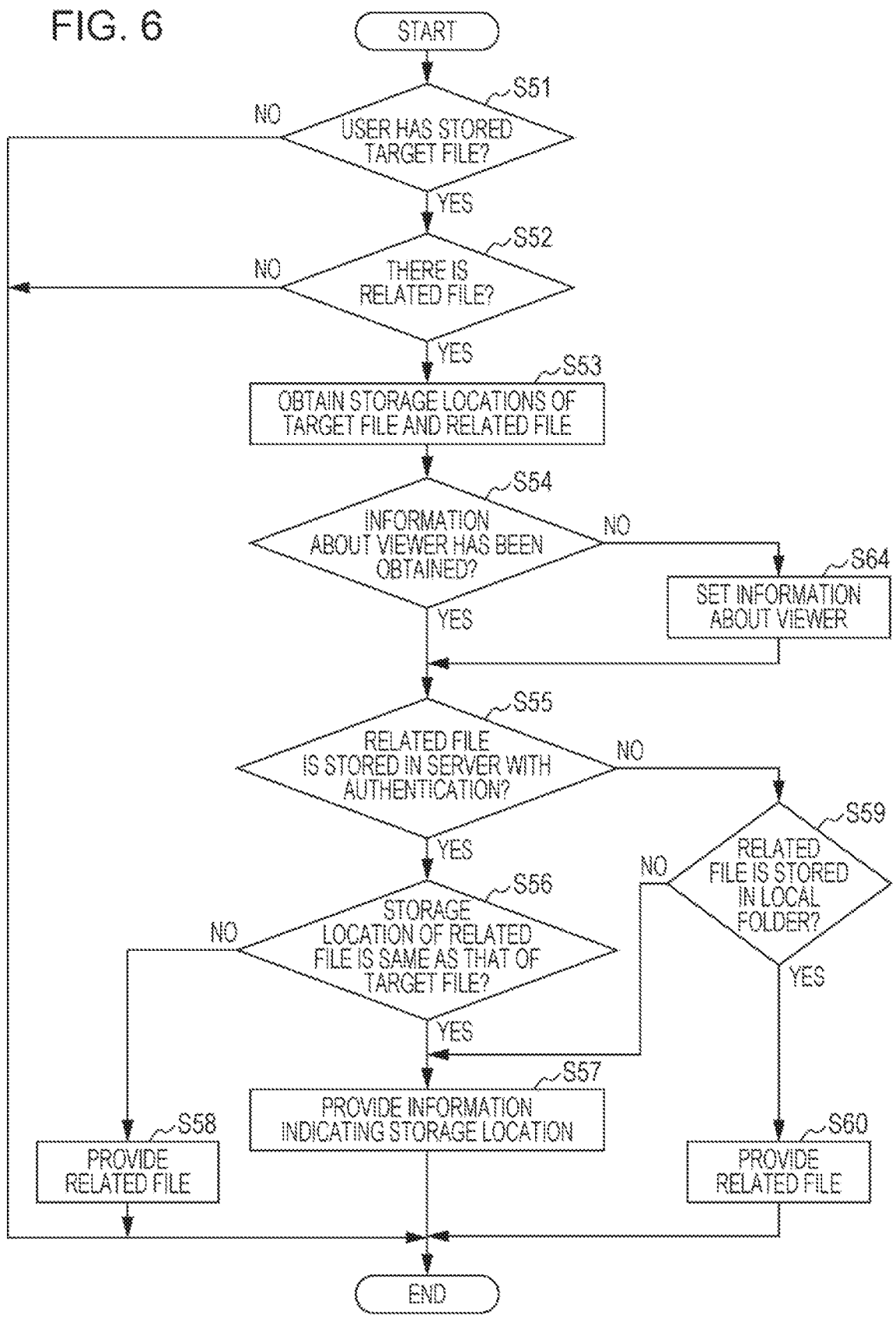
FIG. 6 is a flowchart of a file management process performed by a server.

FIG. 6 is a flowchart of a file management process performed by the server 20 in the file management system 1. The file management process is performed by the CPU 21 reading the file management program from the ROM 22 or the storage 24 and loading the program on the RAM 23 for execution.

Upon reception of any user's input of a file management instruction, the CPU 21 of the server 20 performs the file management process illustrated in FIG. 6.

As illustrated in FIG. 6, the CPU 21 determines whether or not user A has stored a target file 30 (step S51). For example, when a target file 30 has been stored in the storage 14 of the first user terminal 10A, the storage 24 of the server 20, or the like, the CPU 21 determines that user A has stored the target file 30. In the file management process in the example, when user A stores a target file 30, an attribute of the target file 30 is also updated. Examples of an attribute of a target file 30 include a file name, a create date, an update date, an author, and an updater. The examples of an attribute of a target file 30 also include related-file information. When a related file 32 is associated with the target file 30 on the basis of the operation history of the target file 30, its attribute is updated to indicate that the target file 30 has a related file 32. When a related file 32 is not associated with the target file 30 on the basis of the operation history of the target file 30, its attribute is updated to indicate that the target file 30 has no related files 32.

If user A has not stored a target file 30 (NO in step S51), the CPU 21 ends the process based on the file management program. If user A has stored a target file 30 (YES in step S51), the CPU 21 determines whether or not there is a related file 32 relating to the target file 30 (step S52). Whether or not there is a related file 32 relating to the target file 30 is determined on the basis of the attribute of the target file 30. For example, whether or not there is a related file 32 relating to the target file 30 may be determined by using the method described in Japanese Unexamined Patent Application Publication No. 9-330312.

If there is no related file 32 (NO in step S52), the CPU 21 ends the process based on the file management program. That is, if there is no related file 32, the CPU 21 sets nothing to the related-file attribute, and ends update of the related-file attribute.

If there is a related file 32 (YES in step S52), the CPU 21 obtains the storage location of the target file 30 and the storage location of the related file 32 (step S53). On the basis of the storage location of the target file 30 and the storage location of the related file 32, it will be determined whether information (for example, the link) indicating the storage location of the related file 32 is to be provided or the related file 32 (for example, its object) is to be provided, in steps S55, S56, and the like which are described below.

The CPU 21 determines whether or not information about a viewer has been obtained (step S54). The viewer is a person who views the target file 30. For example, to make user B view the target file 30, user A specifies user B as a transmission destination of an electronic mail, writes, in the text, information (for example, the link) indicating the storage location of the target file 30, and transmits the mail. The way to specify a viewer is not limited to transmission of an electronic mail. In a data exchange service such as a messenger, information indicating the storage location of the target file 30 is transmitted or shared. Thus, the transmission destination may be specified as a viewer. The timing at which information about a viewer is obtained is not limited to a timing after the storage location of a target file and the storage location of a related file are obtained. In addition, instead of providing information indicating the storage location of the target file 30, the target file 30 itself may be provided to user B.

If information about a viewer has not been obtained (NO in step S54), the CPU 21 sets information about a viewer (step S64). For example, user A themselves may input information about a viewer (for example, access permission of a viewer) so that the input information is set as information about a viewer. The timing at which information about a viewer is set is not limited to a timing after the storage location of a target file and the storage location of a related file are obtained. In this case, in step S54, it is determined that information about a viewer has been obtained. A description will be made below under the assumption that user B has been specified.

If information about a viewer has been obtained (YES in step S54), or after information about a viewer is set in step S64, the CPU 21 determines whether or not the related file 32 is stored in a server which needs authentication (step S55). A server which needs authentication is, for example, a cloud server, and encompasses other shared servers. A server which needs no authentication is, for example, an in-house network-attached storage (NAS), and encompasses other shared servers. A NAS is an external storage apparatus which is connected directly to a network, and which may be accessed over the network, for example, from a computer.

Whether or not the related file 32 is stored in a server which needs authentication is checked through inquiry to the server. For example, the server 20 transmits an inquiry to the server, corresponding to the storage location of the related file 32, to check necessity of authentication. Alternatively, the server 20 may access the server, corresponding to the storage location of the file 32, as an anonymous user to check necessity of authentication.

If the related file 32 is stored in a server which needs authentication (YES in step S55), the CPU 21 determines whether or not the storage location of the related file 32 is the same as that of the target file 30 (step S56).

If the storage location of the related file 32 is the same as that of the target file 30 (YES in step S56), the CPU 21 provides, to user B, information (for example, the link) indicating the storage location of the related file 32 (step S57). If the storage location of the related file 32 is the same as that of the target file 30, and if information indicating the storage location of the target file 30 has been provided to user B, user B has completed authentication of the target file 30 at the time point of accessing the target file 30. Therefore, since no authentication occurs in accessing the related file 32, only information indicating the storage location of the related file 32 is to be provided.

If the storage location of the related file 32 is not the same as that of the target file 30 (NO in step S56), the CPU 21 provides the related file 32 to user B (step S58). If the storage location of the related file 32 is different from that of the target file 30, user B is not allowed to access the related file 32 directly because authentication occurs in accessing the related file 32. Therefore, user B is provided with the related file 32 itself.

After step S56, the CPU 21 may determine whether or not authentication occurs for each access operation to the related file 32, which is not illustrated in FIG. 6. If authentication does not occur for each access operation to the related file 32, information indicating the storage location of the related file 32 is provided. If authentication occurs for each access operation to the related file 32, the related file 32 (for example, its object) is provided.

If the related file 32 is not stored in a server which needs authentication performed by user B (NO in step S55), the CPU 21 determines whether or not the related file 32 is stored in a local folder (step S59). The local folder corresponds, for example, to a folder which is set on the RAM 13 or the like of the first user terminal 10A used by user A.

If the related file 32 is stored in a local folder (YES in step S59), the CPU 21 provides the related file 32 to user B (step S60). If the related file 32 is stored in a local folder of the first user terminal 10A, user B is not allowed to access the related file 32 stored in the local folder. Therefore, user B is provided with the related file 32.

If the related file 32 is not stored in a local folder (NO in step S59), the CPU 21 causes the process to proceed to step S57. That is, the CPU 21 provides, to user B, information (for example, the link) indicating the storage location of the related file 32 (step S57). If the related file 32 is not stored in a server which needs authentication performed by user B (NO in step S55), and if the related file 32 is not stored in a local folder (NO in step S59), the related file 32 may be stored in a server which needs no authentication or a shared folder which may be accessed by anyone without authentication. Therefore, since user B is allowed to access the related file 32, user B is provided with information indicating the storage location of the related file 32.

After step S57, step S58, or step S60, the CPU 21 ends the process based on the file management program.

Figure 7:
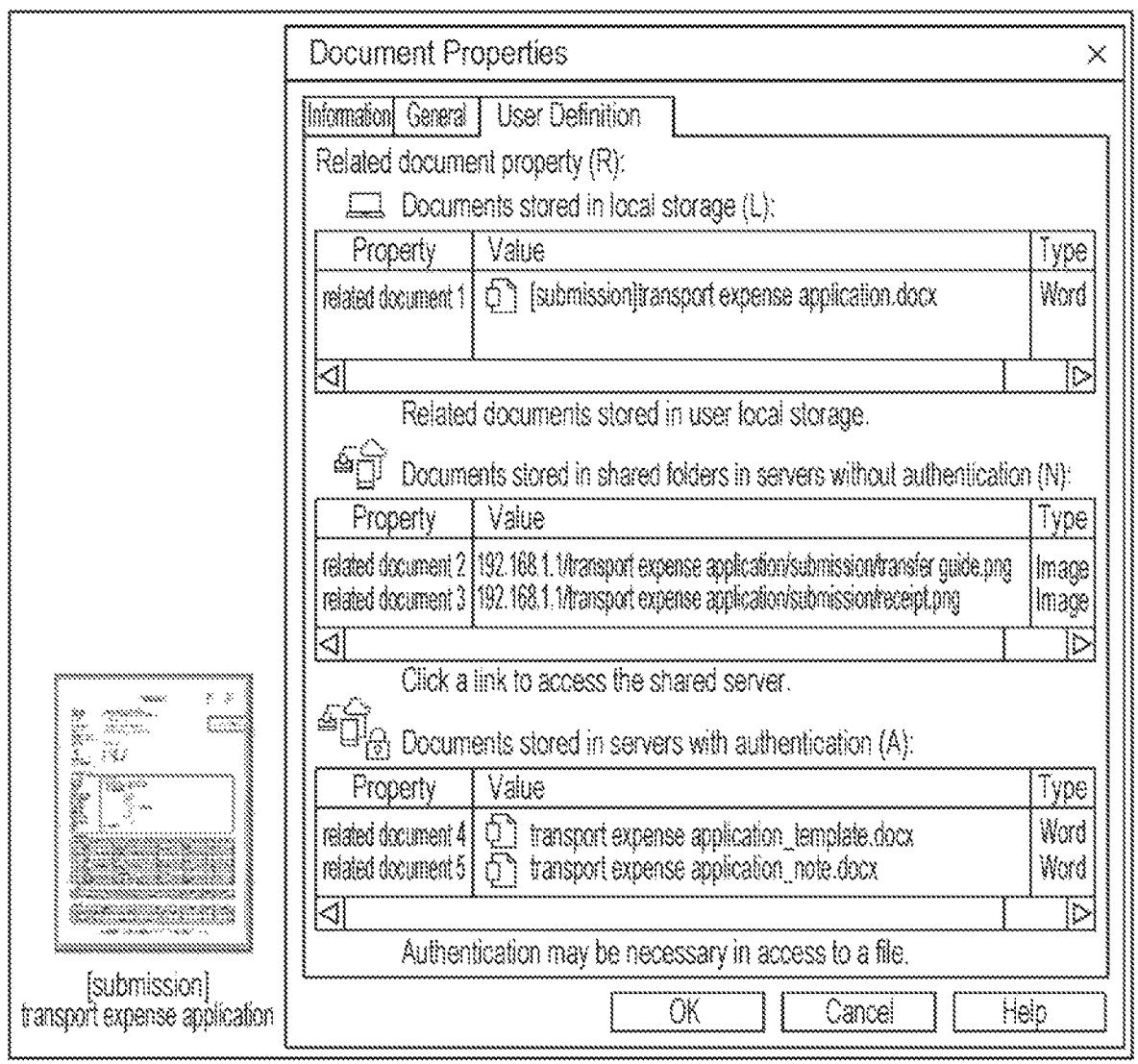
FIG. 7 is a diagram illustrating an exemplary file property dialog screen displayed on a user terminal.

FIG. 7 illustrates a dialog for properties of a target document as an exemplary screen displayed on the second user terminal 10B used by user B. The target document is an exemplary target file which is associated with five related documents as exemplary related files. In the example in FIG. 7, related document 1 itself, which is stored in a local folder, is provided in such a manner as to be attached to the target document. User B clicks the icon or the document name of related document 1. For related documents 2 and 3 stored in a shared folder in a server which needs no authentication, their links indicating the storage locations of related documents 2 and 3 are set. User B clicks the links to open related documents 2 and 3. Related documents 4 and 5 themselves, which are stored in a server which needs authentication, are provided in such a manner as to be attached to the target document. User B clicks the icon or the document name of related document 4 or related document 5 to open the corresponding related document.

Figure 8:
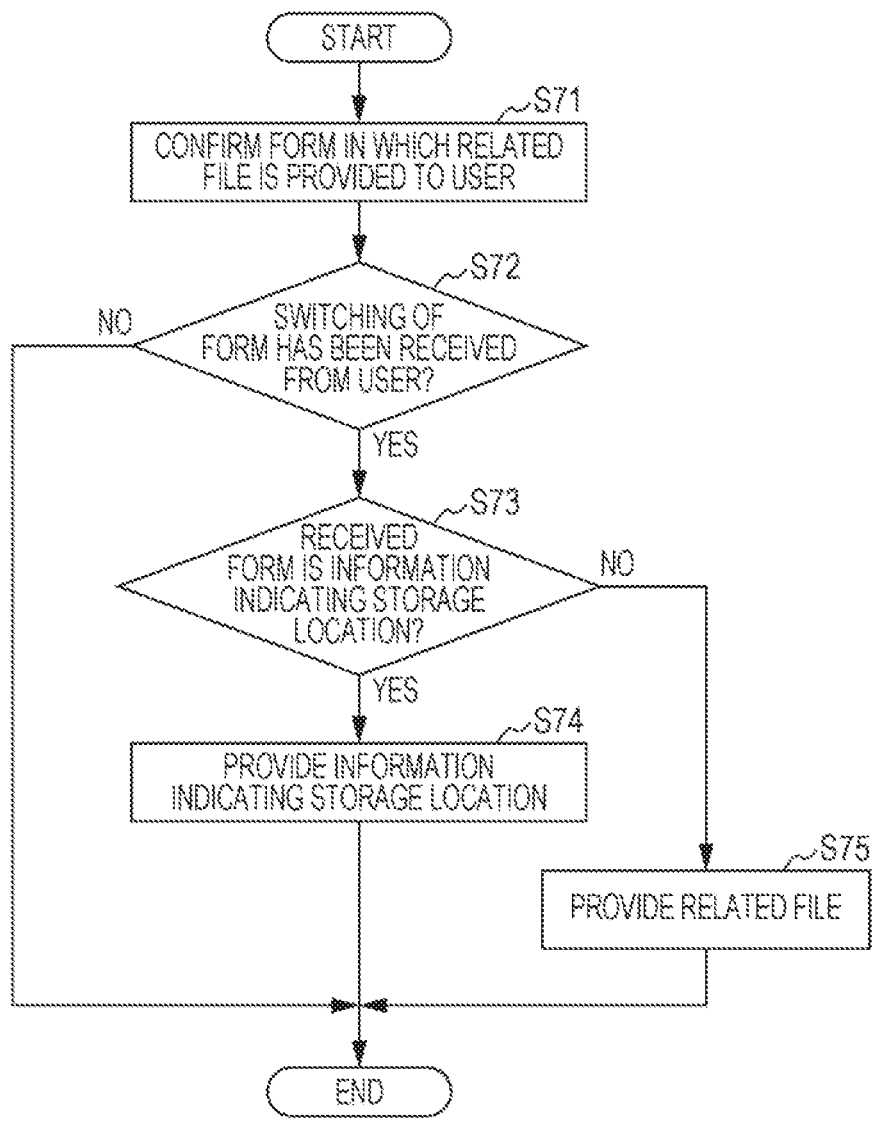
FIG. 8 is a flowchart of a form switching process performed by a server.

FIG. 8 is a flowchart of a form switching process performed by the server 20 in the file management system 1. The form switching process is a process which switches the form, in which a related file is provided in association with a target file. The CPU 21 reads a form switching program from the ROM 22 or the storage 24, and loads the form switching program on the RAM 23 for execution, thus performing a form switching process.

For example, after step S57, step S58, and step S60 in the flowchart in FIG. 6, a form switching process illustrated in FIG. 8 is performed.

As illustrated in FIG. 8, the CPU 21 confirms the form, in which the related file 32 is provided, with user A (step S71). For example, the CPU 21 displays, on the first user terminal 10A, a form confirmation message for confirming, with user A, the form in which the related file 32 is provided and which is determined in step S57, step S58, or step S60 in FIG. 6. For example, the form confirmation message describes whether the "form in which the related file is provided" has been set to the related file 32 itself or information indicating the storage location of the related file 32. In the form confirmation message, for example, selection made by user A is received so that the "form in which the related file is provided" and which has been set is switched between the related file 32 itself and information indicating the storage location of the related file 32.

The CPU 21 determines whether or not switching of the form, in which the related file 32 is provided, has been received from user A (step S72). Switching the form, in which the related file 32 is provided, includes the case in which switching is made from provision of the related file 32 itself to provision of information indicating the storage location of the related file 32, and the case in which switching is made from provision of information indicating the storage location of the related file 32 to provision of the related file 32 itself.

If switching of the form, in which the related file 32 is provided, has not been received (NO in step S72), the CPU 21 ends the process based on the form switching program. If switching of the form, in which the related file 32 is provided, has been received from user A (YES in step S72), the CPU 21 determines whether or not the received form indicates information indicating the storage location of the related file 32 (step S73).

If the received form indicates information indicating the storage location of the related file 32 (YES in step S73), the CPU 21 adds, to the target file 30, information indicating the storage location of the related file 32, and releases the attachment of the related file 32 itself (step S74).

If the received form does not indicate information indicating the storage location of the related file 32 (NO in step S73), the CPU 21 attaches the related file 32 itself to the target file, and deletes information indicating the storage location of the related file 32 (step S75). For example, in transmission of the target file 30, which is attached to a mail, to a mail address outside the company, the mail may be transmitted in such a manner that the form, which has been set to information (for example, the link) indicating the storage location of the related file 32, is switched to the related file 32 (for example, its object).

After step S74 or step S75, the CPU 21 ends the process based on the form switching program.

Figure 9:
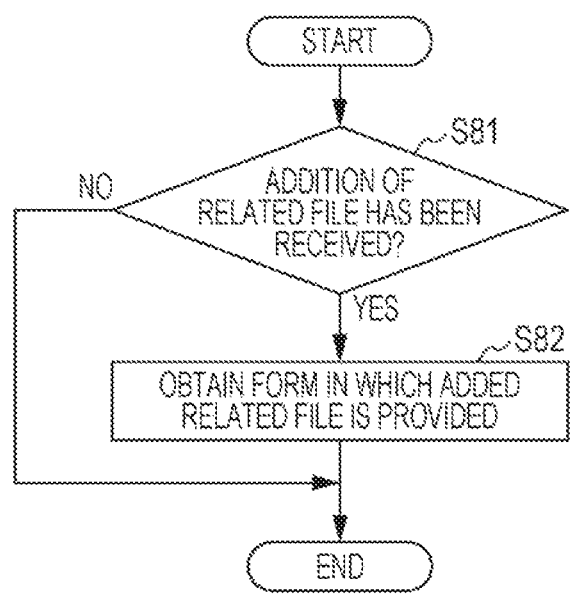
FIG. 9 is a flowchart of an additional-file receiving process performed by a server.

FIG. 9 is a flowchart of an additional-file receiving process performed by the server 20 in the file management system 1. The additional-file receiving process is a process of receiving addition of a related file 32 which is to be associated with a target file 30. The CPU 21 reads an additional-file receiving program from the ROM 22 or the storage 24, and loads the additional-file receiving program on the RAM 23 for execution, thus performing an additional-file receiving process. The additional-file receiving process is performed independently of the processes in FIGS. 6 and 8.

Figure 10:
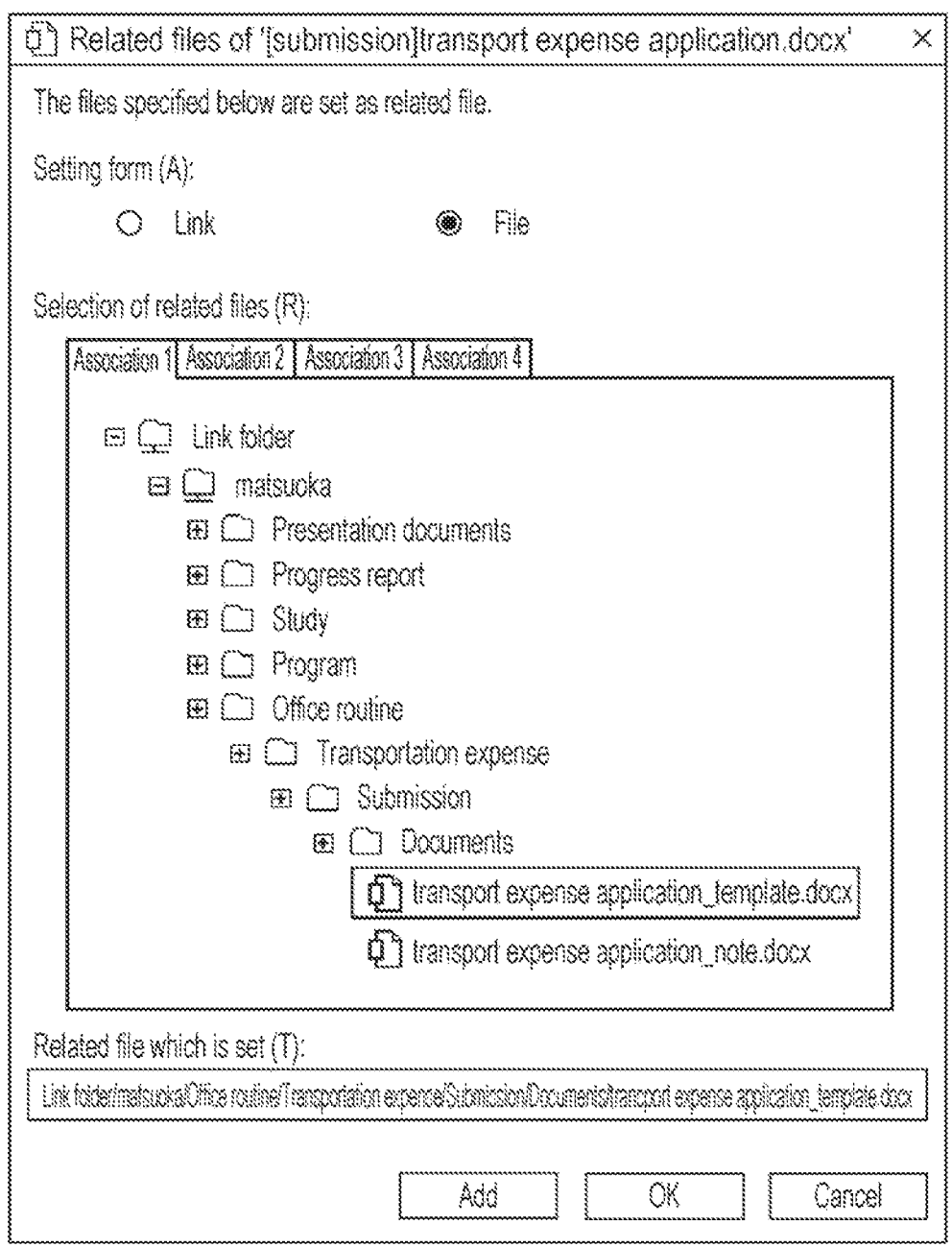
FIG. 10 is a diagram illustrating an exemplary screen which is displayed on a user terminal and in which a related file is added.

As illustrated in FIG. 9, the CPU 21 determines whether or not addition of a related file 32, which is to be associated with a target file 30, has been received (step S81). As illustrated in FIG. 10, a related file 32 is added on an additional-file receiving screen displayed on the first user terminal 10A. User A selects a file, which is to be added, from a folder under hierarchical levels, thus adding the file as a related file 32. In this way, addition of a related file 32 is received.

If addition of a related file 32 has not been received (NO in step S81), the CPU 21 ends the process based on the additional-file receiving program. If addition of a related file 32 has been received (YES in step S81), the CPU 21 obtains the form in which the added related file 32 is provided (step S82). The types of the form, in which the added related file 32 is provided, include information indicating the storage location of the related file 32 and attachment of the related file 32 itself.

As illustrated in FIG. 10, when a related file 32 is to be added, user A sets the setting form to either one of the link (information indicating the storage location) and the file (object). Thus, the form, in which the added related file 32 is provided, is obtained. Then, the process based on the additional-file receiving program ends.

When a related file 32 is to be associated with a target file 30, the file management system 1 described above enables the related file 32 to be accessed regardless of the storage location of the related file 32, and enables the data amount of the target file 30 to be suppressed compared with the case in which all of the related files 32 are attached to the target file 30.

The processes performed by the user terminals 10 and the server 20 may be implemented by using dedicated hardware circuits. In this case, the processes may be performed by using a single piece of hardware, or may be performed by using multiple pieces of hardware.

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

A program for operating the user terminals 10 and the server 20 may be provided by using a computer-readable recording medium, such as a Universal Serial Bus (USB) memory, a flexible disk, or a compact disc read only memory (CD-ROM), or may be provided online over a network such as the Internet. In this case, the program recorded in a computer-readable recording medium is typically transferred to a memory, a storage, or the like, and is stored. The program may be provided, for example, as a single piece of application software, or may be embedded in software of the apparatuses as one of the functions of the user terminals 10 and the server 20.

In the exemplary embodiment, one server 20 is provided. However, the present disclosure may be applied to a file management system having multiple servers.

The specific exemplary embodiment of the present disclosure is described in detail. For those skilled in the art, it is clear that the present disclosure is not limited to the exemplary embodiment, and that other various exemplary embodiments may be made in the scope of the present disclosure.

What is claimed is:

1. A file management system comprising:
at least one processor configured to
obtain information about a target file, a storage location of a related file, and a viewer, the related file relating to the target file,
determine whether the viewer is allowed to access the storage location of the related file; and
provide the viewer one of
storage-location information indicating the storage location of the related file and
the related file, wherein
the storage-location information indicating the storage location of the related file is provided to the viewer in response to the processor determining that the viewer is allowed to access the storage location of the related file because
the storage location of the related file does not require authentication of a user and is not local, or
the storage location of the file requires authentication of the user and is not where the target file is stored,
the related file is provided to the viewer in response to the processor determining that the viewer is not allowed to access the storage location of the related file because
the storage location of the related file does not require authentication of the user and is local, or
the storage location of the file requires authentication of the user and is where the target file is stored,
the at least one processor is configured to confirm, with the user, a form in which the related file is provided to the viewer, the user managing the target file, and
the at least one processor is configured to receive, from the user, information about whether the form in which the related file is provided to the viewer is to be switched from the storage-location information to the related file, or from the related file to the storage-location information.

2. The file management system according to claim 1, wherein the at least one processor is configured to receive addition of the related file and to, in the addition, receive information about a setting defining whether the related file is provided to the viewer in a form of the storage-location information or in a form of the related file.

3. A non-transitory computer readable recording medium storing a program causing a computer to execute a process for file management, the process comprising:
obtaining information about a target file, a storage location of a related file, and a viewer, the related file relating to the target file;

determining whether the viewer is allowed to access the storage location of the related file; and providing the viewer one of
- storage-location information indicating the storage location of the related file and
- the related file, wherein the storage-location information indicating the storage location of the related file is provided to the viewer in response to determining that the viewer is allowed to access the storage location of the related file because the storage location of the related file does not require authentication of a user and is not local, or the storage location of the file requires authentication of the user and is not where the target file is stored, and the related file is provided to the viewer in response to determining that the viewer is not allowed to access the storage location of the related file because the storage location of the related file does not require authentication of the user and is local, or the storage location of the file requires authentication of the user and is where the target file is stored, further comprising confirming, with the user, a form in which the related file is provided to the viewer, the user managing the target file, and receiving, from the user, information about whether the form in which the related file is provided to the viewer is to be switched from the storage-location information to the related file, or from the related file to the storage-location information.

4. A file management system comprising:

means for obtaining information about a target file, a storage location of a related file, and a viewer, the related file relating to the target file;

means for determining whether the viewer is allowed to access the storage location of the related file; and means for providing the viewer one of
- storage-location information indicating the storage location of the related file and
- the related file, wherein the storage-location information indicating the storage location of the related file is provided to the viewer in response to determining that the viewer is allowed to access the storage location of the related file because the storage location of the related file does not require authentication of a user and is not local, or the storage location of the file requires authentication of the user and is not where the target file is stored,
  the related file is provided to the viewer in response to determining that the viewer is not allowed to access the storage location of the related file because the storage location of the related file does not require authentication of the user and is local, or the storage location of the file requires authentication of the user and is where the target file is stored, further comprising means for confirming, with the user, a form in which the related file is provided to the viewer, the user managing the target file, and means for receiving, from the user, information about whether the form in which the related file is provided to the viewer is to be switched from the storage-location information to the related file, or from the related file to the storage-location information.

\* \* \* \* \*